May 15, 1962 F. E. BOLLIGER 3,034,582
LOAD-SPEED CONTROL SYSTEM FOR TURBINE ENGINES
Filed Sept. 30, 1957 2 Sheets-Sheet 2

Inventor
FREDERIC E. BOLLIGER

United States Patent Office 3,034,582
Patented May 15, 1962

3,034,582
LOAD-SPEED CONTROL SYSTEM FOR
TURBINE ENGINES
Frederic E. Bolliger, Bethesda, Md., assignor, by mesne assignments, to The Garrett Corporation, Los Angeles, Calif., a corporation of California
Filed Sept. 30, 1957, Ser. No. 686,945
11 Claims. (Cl. 170—135.74)

The present invention relates in general to load speed control systems and more particularly concerns a novel system for regulating an engine which drives the rotor of a convertiplane, when operating as a helicopter, and supplies thrust, when operating as a fixed wing aircraft. Apparatus constructed according to the invention maintains the rotor speed substantially constant despite rapid changes in the collective pitch. Another feature of the invention results in smooth change-over from fixed wing to rotary wing operation, despite wide variations in the speed of the engine at the time change-over is effected.

While the invention has application wherever it is desired to maintain a load speed constant despite wide and sudden changes in the magnitude of the load, it is especially useful in connection with maintaining the rotor speed of a rotary wing aircraft constant as the collective pitch of the blades is varied. Another aspect of the invention is useful where it is desired to selectively couple a turbine engine or other prime mover to alternate loads, one of which must be driven at substantially constant speed, and coupled to the engine only when the engine power is correctly set for the load and speed at the time of coupling. Both of the aforesaid aspects of the invention are utilized in a convertiplane employing a gas turbine engine to drive a helicopter-type rotor when operating as a rotary wing aircraft, and a conventional propeller, when operating as a fixed wing aircraft.

Accordingly, it is appropriate to first review some basic principles of operation of a rotary wing aircraft in order to better understand the operation of the novel control system. As the rotor revolves, thrust is provided in a direction substantially perpendicular to the plane in which the blades rotate. The magnitude of this thrust is related to the rotor angular velocity and the blade pitch. When the blades are rotating in the horizontal plane, the thrust is entirely upward, and if the aircraft is initially stationary, its movement will be entirely vertical without any translational components. Under these conditions, the pitch of a blade is independent of the instantaneous angular orientation of the blade and the cyclic pitch is said to be zero. This static pitch, independent of the angular orientation of the blades, is called the collective pitch. When the plane of rotation is tilted, there is a lateral component of thrust and translational motion is imparted to the aircraft. Viewing the aircraft from the top, and assuming that it is then moving forward, the rotor is normally seen to rotate counterclockwise. As a result of the forward and rotational velocities, blades on the starboard, or right, side of the aircraft have a velocity relative to the air which is greater than the velocity of blades then on the port, or left, side of the aircraft. As a result, if the blade pitch remains constant, a blade on the starboard side would provide more lift than a blade on the port side. The reverse would be true if the aircraft were moving backward, and a similar condition of unbalanced lift would result if the craft were moving to the right or left.

To eliminate this condition, the pitch of the blade is cyclically varied in accordance with the angular position of each blade, the magnitude of the pitch variation being dependent upon the aircraft vector velocity and rotor angular velocity. This correction is called the cyclic pitch adjustment and is facilitated if the rotor angular velocity remains substantially constant, for then corrections need only be made for variations in the translational velocity However, as the collective pitch is varied, the load upon the rotor is accordingly varied and the power supplied from the engine must be changed in order to maintain the rotor speed constant. In conventional helicopters, the pilot then has three three interacting controls, the cyclic pitch adjustment, the collective pitch adjustment and the throttle. In most helicopters, these controls are independently adjustable. The desirability of providing means whereby adjustment of the collective pitch would not affect the rotor speed is apparent, but heretofore, such devices have been effective only if changes in collective pitch were gradually introduced. If the change were sudden, the rotor speed might change to an unsafe value resulting in severe vibration and possibly upset of the aircraft.

Additional problems are presented when it is desired to use such a load speed control in a convertiplane where the same engine drives the rotor when rotary wing operation is desired, and provides translational thrust when the aircraft is being operated as a fixed swing aircraft. If the load speed control is not set properly for the rotor speed, collective pitch and engine power when transferring the engine from providing thrust to driving the rotor, the change-over will be rough and may result in upset or severe damage to the aircraft.

The present invention contemplates and has as a primary object the provision of a load speed control system for appropriately energizing a prime mover whereby a first load, though subject to change at a relatively rapid rate, is driven by the prime mover at constant speed in accordance with the setting of a load speed control. When the prime mover is coupled to another load not subject to such wide variations, and then changed back to driving the first load, it is an object to maintain the load speed control properly set for the speed of the first load and prime mover power at the time of change-over. More specifically, it is an object to maintain the rotor speed of a convertiplane constant as the collective pitch is varied when operating as a rotary wing aircraft, change the prime mover from driving the rotor to driving a conventional propeller for fixed wing operation, whereby the propeller angular velocity is controlled by the pilot while the load speed control of the rotor is automatically set properly for the rotor speed, collective pitch and rate of fuel supplied to the engine at the time change-over from fixed wing operation back to rotary wing operation is desired.

It is an object of the invention to provide a load speed control lever for establishing the speed setting of the load speed control system whenever the load speed control switch is in the "on" position, corresponding to selection of rotary wing operation.

Another object of the invention is to simultaneously and substantially equally drive all engine power levers in a direction to cause the load speed to be equal to the load speed selected in accordance with the position of the load speed control lever when the load speed control switch is in the "on" position.

Still another object of the invention is to drive the load speed control lever to a position at which the load speed setting is equal to the load speed with the load speed control switch in the "off" position, the load speed control lever then having no effect upon engine power.

A further object of the invention is the provision of a control system in accordance with the preceding objects which is independent of electrical circuitry and electronics.

A still further object of the invention is to provide a control system in accordance with the preceding objects of relatively modest complexity, highly reliable, yet compact and lightweight.

It is a still further object of the invention to provide a control system according to the preceding objects so constructed that scheduling devices, cams and levers may be readily replaced in the field by qualified personnel with other such elements to provide new schedules.

Still a further object of the invention is to provide a mechanical control system in accordance with the preceding objects which operate satisfactorily without external lubrication.

According to the invention, the novel control system includes a load control, a prime mover control for regulating the power delivered by a prime mover which drives the load, and a load speed control for setting the load speed to a desired value. Means are provided for coupling the load control to the prime mover control whereby the latter follows the movement of the former after a predetermined delay interval to effect an initial change in the power delivered by the prime mover to prevent an initial change in the load speed. Thereafter, the load speed remains substantially constant because the position of the prime mover control is determined by means responsive to the load speed and the setting of the load speed control.

In another aspect of the invention, switching means are provided for selectively controlling the prime mover control in the above manner when in a first position, and in a second position, substituting therefor means responsive to the setting of the prime mover control and the load speed for adjusting the load speed control to a setting which corresponds to the power then being delivered by the prime mover and the load then selected by the load control, whereby switching between the two conditions, related to the two switching positions, occurs smoothly.

In a specific embodiment of the invention, for use with a convertiplane, the load control sets the collective pitch of the rotor blades. The prime mover comprises one or more gas turbine engines, the prime mover control being the power levers of the engines. The rotational speed of the load is sensed by a flyball which exerts a force on a pilot valve, which force is balanced by a spring compressed through a cam whose position is determined by the load speed control lever. The motion of the pilot valve is coupled through a feedback system to a servo valve whose motion controls the position of the power lever in a manner tending to bring the actual load speed into coincidence with the selected load speed.

With the load speed control switch in the "off" position, the power lever may be manually controlled and movement of the servo valve is used to control the position of the load speed control lever to correspond substantially to the speed sensed by the flyball. Then, when the load speed control switch is changed to the "on" position, the change-over is smoothly effected.

Other features, objects and advantages of the invention will become apparent from the following specification when read in connection with the accompanying drawing in which.

Figure 1:
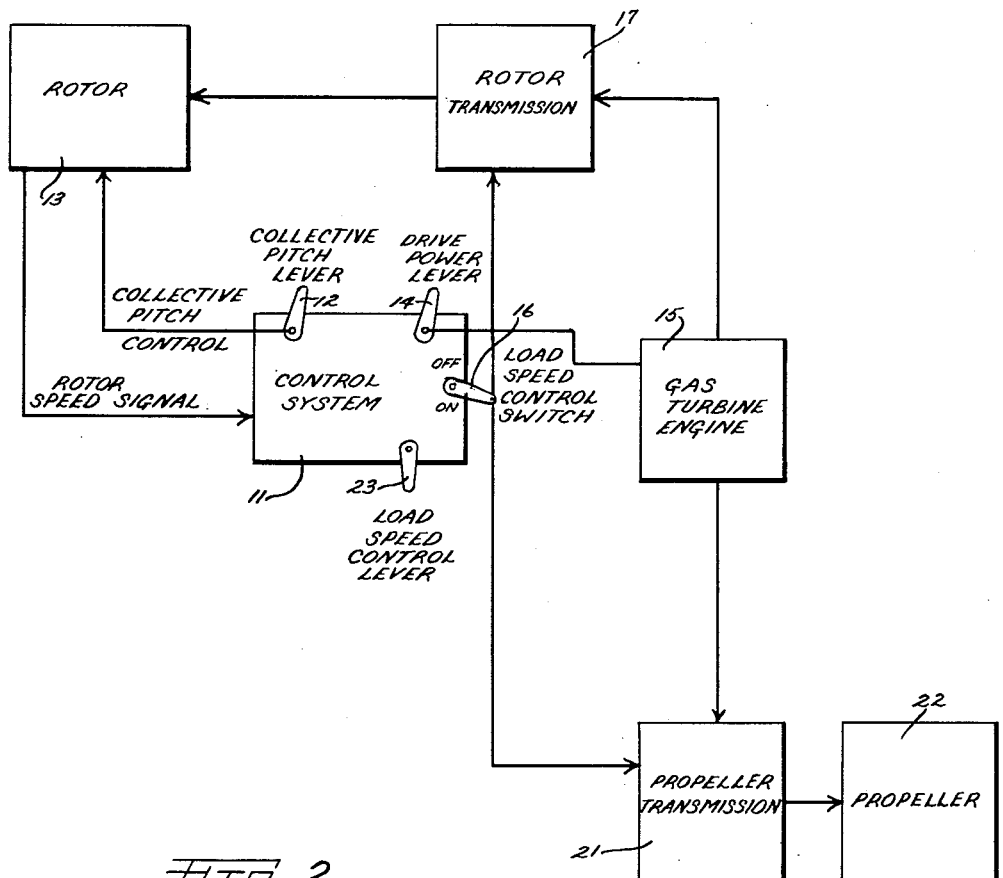
FIG. 1 is a block diagram generally illustrating the relationship of the novel control system to the thrust-producing means utilized in a convertiplane.

With reference now to the drawing and more particularly FIG. 1 thereof, there is illustrated a block diagram which generally illustrates the relationship of the novel control system to the convertiplane rotor, propeller, engine and intercoupling transmissions. The control system 11 is seen to include a collective pitch lever or load control 12 which controls the collective pitch of rotor 13, a drive power lever or prime mover control 14 which controls the power delivered by gas turbine engine 15, a load speed control switch 16 which is in the "on" position when rotor transmission 17 is enabled whereby rotor 13 may be driven by gas turbine engine 15 and propeller transmission 21 is precluded from coupling power from gas turbine engine 15 to propeller 22. In the "off" position the reverse situation occurs, and load speed control lever 23 which, with load speed control switch 16 in the "on" position, selects the speed of rotation for rotor 13, is properly set for the rotor speed, regardless of the setting of the collective pitch control 12. A signal indicative of rotor speed is coupled from rotor 13 to control system 11.

Generally, operation of the system for a typical flight is as follows:

Initially, the convertiplane is at rest with the engine idling and the load speed control switch in the "on" position, thus selecting rotary wing operation. Rotor transmission 17 will transmit power to rotor 13 when the pilot engages the rotor clutch (not shown). The pilot increases the rotor speed by adjusting load speed control lever 23 until the desired operating rotational velocity is reached. Through suitable mechanisms inside control system 11 described in detail below, the drive power lever is automatically moved by the internal mechanism in response to the load speed control lever setting and the rotor speed signal. When the desired rotational velocity is reached, the pilot increases the collective pitch lever or load control 12, the control system 11 automatically moving drive power lever or prime mover control 14 so that the rotor angular velocity remains at all times substantially constant. When the aircraft is airborne it is operated as a conventional helicopter, with the exception that drive power lever 14 is automatically moved by control system 11 in response to changes in collective pitch to maintain rotor speed substantially constant. The pilot is thus relieved of adjusting throttle while watching the rotor tachometer when the collective pitch is changed.

When the aircraft is moving forward at a sufficient velocity, operation as a fixed wing aircraft is selected by moving load speed control switch 16 to the "off" position, thereby disabling rotor transmission 17 and enabling propeller transmission 21 to transmit power from gas turbine engine 15 to propeller 22. With load speed control 16 in the "off" position, drive power lever 14 is manually operated by the pilot to control the power supplied by gas turbine engine 15 and accordingly, the speed of the aircraft during fixed wing operation. At the same time, suitable mechanisms in control system 11, described in detail below, cause load speed control lever 23 to follow movement of drive power lever 14 whereby the load speed control lever 23 is always properly set to permit immediate coupling of gas turbine engine 15 to drive rotor 13 without danger of the aircraft upsetting. Thus, when it is desired to land the aircraft, the pilot will normally back off on power to the gas turbine engine, thereby slowing the aircraft, move load speed control switch to the "on" position and operation as a rotary wing aircraft is resumed, the transition occurring smoothly.

Figure 2:
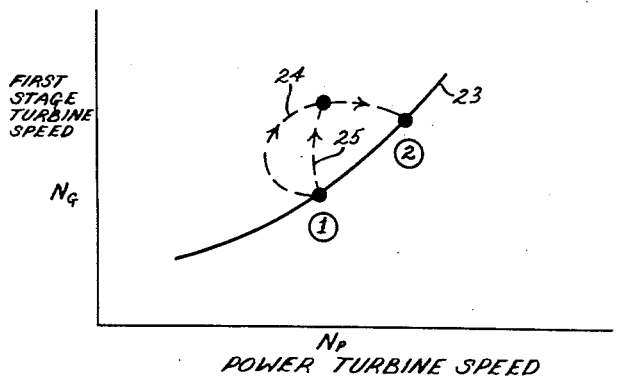
FIG. 2 is a graphical representation of the functional relationship between the first stage turbine speed and the power turbine speed as the load changes.

Before discussing in detail the novel control system, another feature of the invention will be better understood by referring to FIG. 2 which graphically represents the functional relationship between the first stage turbine speed of gas turbine engine 15 and the speed of the power turbine therein which supplies power directly to rotor transmission 17. In a preferred form, gas turbine engine 15 is of the multiple stage type, thereby enabling the driving power to be obtained from a turbine wheel operating at relatively low angular velocity. Generally, the coupling between the power turbine and earlier turbine stages is entirely fluid. Accordingly, even though the power control is moved to a new position which increases the power supplied by the engine under steady state conditions by the amount of change in power required by the increase in load, the transient response results in an initial decrease in the power turbine speed when the load is suddenly increased. In FIG. 2, curve 23 illustrates the desired static operating characteristic of first stage turbine speed $N_G$ as a function of power turbine speed $N_P$. In changing from old operating point 1 to new operating point 2 in response to an increase in load, the path of operation is over broken line 24. It is seen that although the first stage turbine speed increases, the power turbine speed initially decreases. Thus, with a conventional load speed control system a relatively rapid change in the rotor collective pitch would result in an initial decrease in the rotational velocity of the motor and a jerk would be felt inside the aircraft. By utilizing the inventive concepts, the path of operation during a change requiring increased power is over the path indicated by broken line 25. Note that the power turbine speed initially remains essentially constant; hence, the change in collective pitch, though relatively rapid, causes no jerk within the aircraft.

Figure 3:
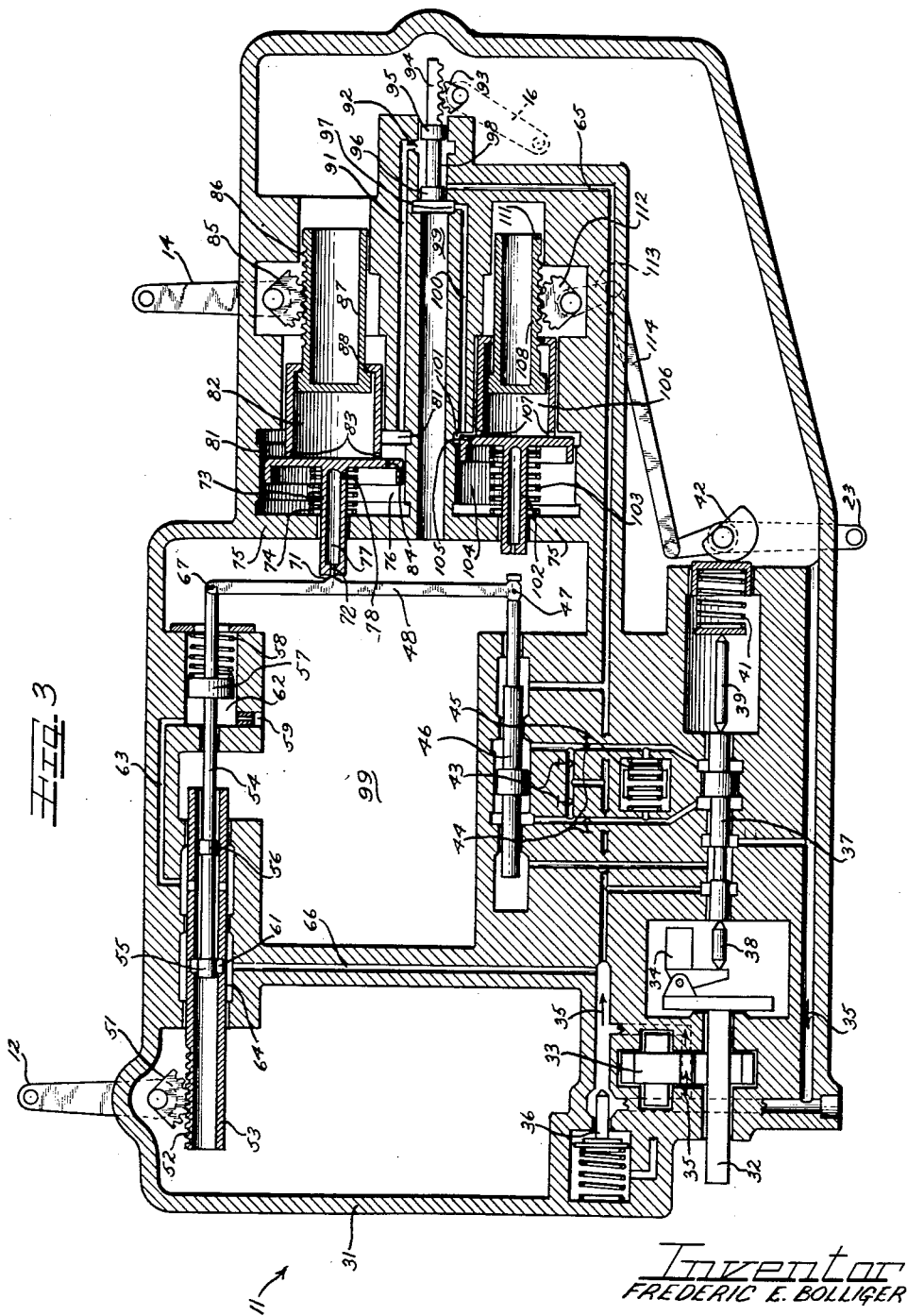
FIG. 3 is a view, partially in cross-section, of a preferred embodiment of the control system of FIG. 1.

The foregoing discussion should facilitate understanding the mode of operation of a preferred embodiment of the control system illustrated, partially in cross-section in FIG. 3. Before discussing the mode of operation, the physical arrangement of the various elements which comprise this embodiment will be described. The system is supported within an outer wall 31 having an opening for accommodating a shaft 32 which rotates in accordance with the actual load speed of the rotor 13. Rotation of shaft 32 drives a gear pump 33 and a flyball governor 34. Gear pump 33 drives hydraulic fluid through the various fluid channels in the direction indicated by the arrows 35. A spring actuated pressure regulator 36 maintains the hydraulic pressure substantially constant. Flyball 34 acts on pilot valve 37 through member 38. The pilot valve 37 force is counterbalanced by a force transmitted through member 39 pressed upon by spring 41 which rests against the cam 42 attached to lever 23. Pilot valve 36 controls the flow of hydraulic fluid through a feedback system which comprises variable resistances 43 and 44 and a capacitance 45 to control the movement of servo follower valve 46 which controls the horizontal position of end 47 of link 48.

Collective pitch lever 12, drive power lever 14, load speed control 16 and load speed control lever 23 extend outside of outer wall 31. Collective pitch lever 12 rotates quadrant gear 51 which rides in rack 52 of sleeve 53. Shaft 54 is slidable within sleeve 53 on collars 55 and 56 and rigidly connected to piston 57 acted upon by spring 58. Collar 55 is illustrated covering opening 61 and preventing hydraulic fluid from reaching chamber 62 through line 63 from well 64, fluid being supplied to the latter well from main hydraulic line 65 through line 66. Chamber 62 communicates with drain 99 through restriction 59. The end 67 of shaft 54 is pivotally attached to link 48 which has a round bump 71 pressing against an opening 72 of a servo follower piston 73 which is pressed upon by a spring 74 resting against the inner wall 75. The chamber 76 within which the servo follower piston 73 rides communicates with the chamber 77 inside the latter piston through opening 78 while chamber 81 communicates with chamber 82 through openings 83 and an opening 84 connects chamber 76 with chamber 81. Power lever 14 and quadrant gear 85 rotate together, the latter riding on rack 86 of auxiliary piston 87 which rides within chamber 82 and is shown in its extreme right position against a stop 88. Hydraulic fluid may enter chamber 81 through line 91 and opening 92 with load speed control switch 16 in the "on" position as shown. Sectional gear 93 is rotated by switch 16 and rides in rack 94 having collars 95 and 96, which in the "off" position block openings 92 and 97, respectively. Chamber 98 communicates with main line 65 while opening 97 communicates with drain 99 and is adjacent line 100 which in turn communicates with chamber 101 which accommodates servo follower piston 102 pressed upon by spring 103, the latter being supported by inner wall 75. Chamber 101 communicates with chamber 104 through opening 105 and with chamber 106 through openings 107, auxiliary piston 108 riding within chamber 106 with rack 111 on the piston 108 meshing with quadrant gear 112 secured to rod 113. Link 114 is pivotally attached to the ends of load speed control lever 23 and rod 113.

The structural features of the instant invention may be described in somewhat different terms as follows. Hidraulic fluid from the main supply line 65 is admitted through a port 92 and line 91 into chamber 81 of a servo follower piston 73. Through holes 83 hydraulic fluid is admitted into chamber 82 and pushes the auxiliary piston 87 to its extreme right position against a stop 88. It may thus be seen that with the load speed control switch in its "on" position, the auxiliary piston 87 acts as one with the servo follower piston 73.

With the load speed control switch 16 in its "on" position, port 97 communicates with the drain and so does line 100 and chamber 101 of servo follower piston 102, and since through the holes 107 chamber 106 communicates with chamber 101, auxiliary piston 108 is free to move with respect to the servo follower piston 102. Any motion introduced through the load speed control lever through a toothed qadrant on auxiliary piston 108 will not be transmitted to the servo follower piston 102, as long as port holes 107 and line 100 are "relatively large."

It may be seen that with the load control switch in the "off" position, the auxiliary piston 87 can be moved freely with respect to the servo follower piston 73, whereas the auxiliary piston 108 is rigidly connected to the servo follower piston 102. Turning the load speed control switch from the "on" to the "off" position results in exchanging the mode of operation of the upper and lower servo follower pistons. Referring again to the system with the switch in its "on" position, the collective pitch lever 12 moves sleeve 53 in an axial direction, and follower piston 57 follows any motion of the collective pitch lever in the following manner.

If the sleeve 53 is moved to the right, hydraulic fluid from the main line 65 is admitted through the opening 61 and line 63 into chamber 62, moving piston 57, compressing spring 58 and thereby closing opening 61 in such a manner that the fluid passing through the opening 61 equals that leaving through the restriction 59. The reverse action takes place if the sleeve 53 is moved to the left, opening 61 then becomes closed and the fluid leaves the chamber 62 through the restriction 59. It is therefore now apparent that piston 57 follows any motion of the cylinder 53, with a time lag which may be prescribed. Considering for a moment point 47 fixed, any motion of piston 57 due to a change in collective pitch will be transmitted through the arm 48 to the servo follower piston 73. Piston 73 operates when high pressure hydraulic fluid from the chamber 81 is admitted through a restriction 84 into chamber 76, from which it goes to the drain through the hole 78 and restriction 72. Therefore, if the arm 48 moves to the right and reduces the area of restriction 72, the servo follower piston 73 moves to the right until flow equilibrium is again established. Should the arm 48 go to the left, then the opening of the restriction 72 is increased and the follower piston moves to the left also. Servo follower piston 73 therefore follows any motion of the arm 48 with a prescribed time lag.

The actual rotational speed of the load is measured with a fly ball 34 which exerts a force on the pilot valve 37, which is balanced by the action of a spring 41 compressed through a cam 42 by the position of the load speed control lever 23. By virtue of a feedback system comprising a capacitance 45, as well as variable resistances 43 and 44 acting between the pilot valve 37 and the servo valve 46, the latter follows the former with transfer function characteristics including both proportional and integral action. The actual magnitude of the proportion and integral action are determined by the physical size of the component (piston diameters and spring constants) with a large range of trim available by the variable resistances 43 and 44.

The motion of the servo follower piston 73 is therefore a sum of both a proportional motion of the collective pitch lever 12 and a proportional load speed control.

Having described the structural arrangement of the control system, its mode of operation will be described. Hydraulic fluid is supplied by gear pump 33 driven by the shaft 32 of the rotor speed sensor. The hydraulic fluid is kept at a constant pressure by the pressure regulator 36 and is thereafter distributed to the single components through main pressure line 65. In describing the operation of the load speed control, it is convenient to assume that the load speed control switch 16 is first in the "on" position as illustrated in FIG. 3.

In this case, the aircraft is operating as a helicopter, or rotary wing aircraft. The pilot operates both the collective pitch lever or load control 12 and the load speed control lever 23, whereas the drive power lever or prime mover control 14 is moved automatically according to the power demand determined by collective pitch and load speed.

In describing the system, the detailed operation of all single components will be explained first. Hydraulic fluid out of the main supply line 65 is admitted through port 92 and line 91 into chamber 81 of servo follower piston 73, the operation of which will be described later. Through holes 83, hydraulic fluid is admitted into chamber 82 and pushes the auxiliary piston 87 to its extreme right position against stop 88. It can, therefore, be concluded that, with the load speed control switch 16 in the "on" position, auxiliary piston 87 acts as one with the servo follower piston 73.

With the load speed control switch in the "on" position, port 97 communicates with the drain 99 permitting fluid to flow therein from chamber 101 through line 100. Since, through the holes 107, chamber 106 communicates with chamber 101, auxiliary piston 108 is free to move with respect to servo follower piston 102 and any motion introduced through the load speed control lever 23 linked by link 114, rod 113 and quadrant gear 112 to rack 111 on auxiliary piston 108 will not be transmitted to servo follower piston 102 as long as port holes 107 and line 100 are relatively large.

It may be seen that with the load speed control switch in the "off" position, auxiliary piston 87 can be moved freely with respect to servo follower piston 73 whereas auxiliary piston 108 is rigidly connected to servo follower piston 102. Thus, turning the load speed control switch 16 from the "on" to the "off" position results in exchanging the mode of operation of the upper and lower servo follower pistons 73 and 102 respectively. Returning now to the system with the switch 16 in the "on" position, the collective pitch lever 12 moves sleeve 53 in the axial direction and follower piston 57 follows any motion of collective pitch lever or load control 12 in a manner described as follows:

If sleeve 53 is moved to the right, hydraulic fluid from main line 65 is admitted through the opening 61 and line 63 into chamber 62, moving piston 57, compressing spring 58 and thereby closing opening 61 in such a manner that the fluid passing through opening 61 equals that leaving through restriction 59. It may therefore be concluded, that piston 57 follows any motion of sleeve 53 with a time lag which may be prescribed. Considering for a moment end 47 of link 48 fixed, any motion of piston 57 due to a change in collective pitch will be transmitted through arm 48 to servo follower piston 73. Piston 73 works in the following manner:

High pressure hydraulic fluid from chamber 81 is admitted through a restriction 84 into chamber 76 and from there it goes to the drain 99 through hole 78 and a restriction 72. Therefore, if arm 48 moves to the right and reduces the area of restriction 72, the servo follower piston 73 moves to the right until flow equilibrium is again established. Should the arm 48 go to the left, then the opening of the restriction 72 is increased and the follower piston 73 follows to the left also. Servo piston 73 therefore follows any motion of arm 48 with a prescribed time lag. It is thus to be seen that the load control 12 is coupled to the prime mover control 14 by delay means, whereby the latter control 14 follows movement of the former control 12 after a predetermined time interval which may be adjusted by varying the size of the fluid openings and passages.

The actual rotational speed of the load is measured with a flyball 34 which exerts a force on the pilot valve 37 through member 38 which force is balanced by the action of spring 41 compressed through cam 42 positioned by the setting of load speed control lever 23. By virtue of a feedback system comprising capacitance 45 and variable resistances 43 and 44 acting between pilot valve 37 and servo valve 46, the latter follows the former with transfer function characteristics including both proportional and integral action. The actual magnitude of the proportional and integral action are determined by the physical size of the components (piston diameters and spring constants) with a large range of trim available by the variable resistances 43 and 44. The motion of servo follower piston 73 is therefore a sum of both a proportional motion of the collective pitch lever 12 and a proportional load speed control.

For functional descriptive purposes, it is convenient to assume that the pilot has selected the best load speed for the particular flight condition with the load speed control lever 23, and that after this desired speed has been obtained, the whole system is an equilibrium. The pilot moves collective pitch lever or load control 12 to select a higher pitch angle, sleeve 53 and piston 57 move to the right and servo follower piston 73 responds by turning power lever or prime mover control 14 in the counterclockwise direction, corresponding to a higher power being requested from gas turbine engine 15. Due to the loading effect on the power turbine caused by the increased blade angle, the rotor speed tends to decrease and become smaller than the desired speed set by load speed control lever 23. The load speed control system will, in this case, move the servo valve 46 to the right and thereby add through arm 48 an additional correction to the power lever 14 until such a time that the rotor speed has returned to the desired value.

It will therefore be noted that the system described thus far will not only control indirectly the gas turbine engine 15 in such a manner as to keep the rotor speed at a desired value set by load speed control lever 23, but also requests a higher gas turbine engine power output as soon as the collective pitch lever 12 has been moved anticipating, so to speak, the request of the load speed control system. With this arrangement it is possible to select fairly small control coefficients for the feedback system (required by the length of the shaft between rotor and engine), and yet derive adequate response due to the anticipating action of the collective pitch connection.

The mode of operation will now be described with load speed control switch 16 in the "off" position. In this case servo follower piston 73 and auxiliary piston 87 become inoperative since port 92 communicates with drain 99. High pressure fluid is admitted through port 97 and line 100 into chamber 106, thereby rendering servo follower piston 102 and auxiliary piston 108 operative whereby the latter follows the axial motion of the former. Since the load speed control system now does not transmit any motion to the power lever 14, the pilot is free to move it. The load speed in this mode of operation may be controlled by other means, not necessary to an understanding of this invention. However, flyball 34 still senses the rotor speed and the load speed control system now acts on servo follower piston 102, servo valve 46 acting directly on the latter, which through auxiliary piston 108, quadrant gear 112, lever 113 and link 114 moves load speed control lever 23 to a position coresponding to the actual load speed. This latter operation maintains the required and actual speeds at the same value, thus permitting the load speed control switch 160 to be reset to the "on" position at any time without danger of the aircraft upsetting.

It will be noted that the servo valve 46 is aligned along the same axis as servo follower piston 102, chamber 106 and auxiliary piston 108. As a result, any extraneous displacement of the arm 48 during "off" operation cannot in any manner influence the positioning of load speed control lever 23. It is also noteworthy that the system as shown will always provide the same anticipatory change in power lever setting with changes in collective pitch setting. If, however, it is deemed desirable to vary this as a function of altitude or the like, a cam may be readily introduced between collective pitch lever 12 and sleeve 53. While it is apparent that the system is exceedingly reliable, and failures unlikely, it is appropriate to consider the effects of certain types of failures. For example, assume that the hydraulic system has failed completely so that there is no pressure on any element. In the case of helicopter operation, the pilot is still free to move collective pitch lever 12 and manually control power lever 14, regardless of the position of load speed control switch 23. The aircraft would remain controllable. If operating as a fixed wing turboprop, the failure would have no significant consequence.

If sleeve 53 or piston 57 became frozen, only the anticipating action of the collective pitch connection would be lost. The control would react somewhat slower, but the aircraft would remain controllable. As a further precaution against freezing of sleeve 53 preventing operation of collective pitch lever 12, a clutch might be inserted between the two elements.

Should servo follower piston 73 or auxiliary piston 87 become frozen, the addition of an elastic connection or friction clutch between power lever 14 and the power lever on gas turbine engine 15 would permit control of the aircraft with the pilot operating the engine power lever by hand.

Should the speed sensor or servo load speed control system fail, the pilot could still set the desired rotor speed with the collective pitch angle and main power lever 14. Should servo follower piston 102 or auxiliary piston 108 become frozen, the addition of an elastic connection or a coupling to the load speed control lever 23 would prevent detrimental consequences during helicopter operation. Thus, none of the failures would produce unsafe operation of the aircraft.

It is thus seen that a highly reliable control system has been provided in compact form especially useful for convertiplane and helicopter operation. The use of the novel control system in connection with a convertiplane is by way of example only, the system being useful wherever it is desired to control speed under conditions of varying load. It is apparent that those skilled in the art may make numerous modifications of and departures from the specific embodiment described herein. Consequently, the invention is to be construed as limited only by the spirit and scope of the appended claims.

I claim as my invention:

1. A load speed control system comprising, a load control, a prime mover control for regulating the fuel supplied to the prime mover which drives the load, a load speed control for selecting a desired load speed, means responsive to the load speed and the setting of said load speed control for controlling movement of said prime mover control, means responsive to the setting of said prime mover control and the load speed to control the setting of said load speed control, and means for selectively disabling said prime mover control from responding to the movement of said load control and substituting therefor said means responsive to the setting of the prime mover control and the load speed.

2. A load speed control system comprising, a load control, a prime mover control for regulating the fuel supplied to the prime mover which drives the load, a load speed control for selecting a desired load speed, delay means for coupling said load control to said prime mover control whereby the latter control follows movement of the former after a predetermined delay interval, means responsive to the load speed and the setting of said load speed control for controlling movement of said prime mover control after said predetermined delay interval, means for selectively disabling said prime mover control from responding to movement of said load control and substituting therefor means which respond to the setting of said prime mover control and the load speed to control the setting of said load speed control, and means for selectively disabling the latter means and substituting therefor the means by which the prime mover control follows movement of the load control which selective change results in the driving power supplied by the prime mover to the load maintaining the load speed after such selective disabling, substantially the same as before.

3. A load speed control system comprising, first and second servo followers, means for selectively rendering operative one of said servo followers while disabling the other, a load control, a power control driven by said first servo follower when the latter is rendered operative, means for coupling said load control to said first servo follower whereby the latter responds to movement of the former after a predetermined delay interval, a load speed control for setting a desired load speed, means for coupling said load speed control to said second servo follower whereby the former is driven by the latter when the latter is rendered operative, means responsive to the load speed for providing a force indication thereof, a feedback system responsive to the latter force and the setting of said load speed control for deriving a feedback signal which is transmitted to said first servo follower to move the latter when operative whereby said power control is actuated to bring the actual load speed into substantial coincidence with the speed selected by said load speed control, and which signal imparts movement to said second servo follower when operative effective in positioning said load speed control whereby its setting corresponds substantially to the actual load speed.

4. A load speed control system comprising, a chamber filled with hydraulic fluid, a servo follower piston slidable in said chamber and having first and second hollow chambers through which hydraulic fluid may flow, an auxiliary piston slidable within said second hollow chamber, a power lever moved by axial motion of said auxiliary piston, a small opening in said first hollow chamber, means for spring biasing said servo follower piston whereby its axial position is controlled by the rate of hydraulic fluid flow through said small opening, a load control, means responsive to movement of said load control for varying the effective area of said small opening and accordingly the rate of fluid flow therethrough, and means for filling said second hollow chamber with hydraulic fluid under pressure to lock said auxiliary piston to said servo follower piston.

5. A load speed control system comprising, a chamber filled with hydraulic fluid, a servo follower piston slidable in said chamber and having first and second hollow chambers through which hydraulic fluid may flow, an auxiliary piston slidable within said second hollow chamber, a power lever moved by axial motion of said auxiliary piston, a small opening in said first hollow chamber, means for spring biasing said servo follower piston whereby its axial position is controlled by the rate of hydraulic fluid flow through said small opening, a load control, a speed sensor for providing a signal indicative of the load speed, a load speed control for selecting a desired load speed, means responsive to movement of said load control, said signal indicative of load speed and the setting of said load speed control for varying the effective area of said small opening and accordingly the rate of fluid flow therethrough, and means for filling said second hollow chamber with hydraulic fluid under pressure to lock said auxiliary piston to said servo follower piston.

6. A load speed control system comprising, a chamber filled with hydraulic fluid, a servo follower piston slidable in said chamber and having first and second hollow chambers through which hydraulic fluid may flow, an auxiliary piston slidable within said second hollow chamber, a power lever moved by axial motion of said auxiliary piston, a small opening in said first hollow chamber, means for spring biasing said servo follower piston whereby its axial position is controlled by the rate of hydraulic fluid flow through said small opening, a load control, a speed sensor for providing a signal indicative of the load speed, a load speed control for selecting a desired load speed, a pilot valve whose position is controlled by said signal indicative of load speed and the setting of said load speed control, a servo valve, a hydraulic system having a predetermined transfer function for coupling movement of said pilot valve to said servo valve, means responsive to movement of said servo valve and movement of said load control for varying the effective area of said small opening and accordingly the rate of fluid flow therethrough, and means for filling said second hollow chamber with hydraulic fluid under pressure to lock said auxiliary piston to said servo follower piston.

7. A load speed control system comprising, first and second chambers each filled with hydraulic fluid, first and second servo follower pistons slidable respectively in said first servo follower piston having first and second hollow chambers, said second servo follower piston having at least a second hollow chamber, first and second auxiliary pistons slidable within said second hollow chambers of said first and second servo follower pistons respectively, a power lever moved by axial motion of said first auxiliary piston, a load speed control moved by axial motion of said second auxiliary piston, a small opening in said first hollow chamber, means for spring biasing said first servo follower piston whereby its axial position is controlled by the rate of hydraulic fluid flow through said small opening, means for spring biasing said second servo follower piston whereby its axial position is controlled by an axial force applied thereto, a load control, a speed sensor for providing a signal indicative of the load speed, said load speed control being arranged for selecting a desired load speed, a pilot valve whose position is controlled by said signal indicative of load speed and the setting of said load speed control, a servo valve, a hydraulic system having a predetermined transfer function for coupling movement of said pilot valve to said servo valve, means for selectively filling only one of said second hollow chambers with hydraulic fluid under pressure to lock but one of the auxiliary pistons to its associated servo follower piston, means responsive to movement of said servo valve and movement of said load control for varying the effective area of said small opening and accordingly the rate of fluid flow therethrough when the first auxiliary and servo follower pistons are locked together, and means responsive to movement of only said servo valve for transmitting an axial force upon said second servo follower piston when the second auxiliary piston is locked thereto.

8. A load speed control system for use with a convertiplane having a rotor, propeller and engine, which system comprises, first and second servo followers, means for selectively rendering operative one of said servo followers while disabling the other, a pitch control for adjusting the collective pitch of said rotor, a power control driven by said first servo follower when the latter is rendered operative which control regulates power delivered by the convertiplane engine, means for coupling said rotor pitch control to said first servo follower whereby the latter responds to movement of the former after a predetermined time interval, a load speed control for setting a desired rotor speed, means for coupling said load speed control to said second servo follower whereby the former is driven by the latter when the latter is rendered operative, a flyball responsive to the rotor speed for providing a force indication thereof, a feedback system responsive to the latter force indication and a force indicative of the setting of said load speed control for deriving a feedback signal which is transmitted to said first servo follower to move the latter, when operative, whereby said power control is actuated to bring the actual rotor speed into substantial coincidence with the speed selected by said load speed control when said aircraft is in rotary wing operation, and which signal imparts movement to said second servo follower, when operative, effective in positioning said load speed control whereby its setting corresponds substantially to the actual rotor speed when said convertiplane is in fixed wing operation with said propeller being driven by said engine.

9. A load speed control system comprising, a chamber filled with hydraulic fluid, a servo follower piston slidable in said chamber and having first and second hollow chambers through which hydraulic fluid may flow, an auxiliary piston slidable in said second hollow chamber, a power lever moved by axial motion of said auxiliary piston, an aperture in said first hollow chamber, means biasing said servo follower piston whereby its axial position is controlled by the rate of hydraulic fluid flow through said aperture, a load control, and means responsive to movement of said load control for varying the effective area of said aperture and accordingly the rate of fluid flow therethrough.

10. A load speed control system comprising a supporting housing with an inner wall having an opening, a servo follower piston provided with a front portion slidable in said opening, said piston further havng a hollow rear portion, an auxiliary piston axially slidable in said hollow rear portion, a drive power lever connected to said auxiliary piston and receiving axial motion therefrom, a spring surrounding said front portion and supported between said inner wall and servo follower piston in the chamber in which said servo follower piston slides, said front portion having a hollow chamber therein having a front and rear opening, the rear opening communicating with the chamber containing said spring, the latter chamber communicating with the rear portion of the chamber in which said servo follower piston slides, the latter rear portion communicating with the hollow rear portion of said piston through a small opening, a lever having a bump thereon positioned opposite said front opening of said chamber in the front portion of said servo follower piston, the position of the bump controlling the effective area of said front opening, a shaft pivotally attached to one end of said lever and having collars formed thereon, a spring loaded piston secured to said shaft, means defining a chamber slidably receiving said spring loaded piston and having an input conduit and an output restriction communicating with a drain, a hollow sleeve receiving the collars on said spring loaded shaft, means cooperating with said sleeve to define a well, one of said collars being effective to regulate the flow of hydraulic fluid from said well to said input conduit, a load control lever which, when moved, imparts axial motion to said sleeve, and means for supplying hydraulic fluid to said well, conduit and chambers under pressure to lock said auxiliary piston to said servo follower piston whereby motion of said load control lever is imparted to said drive power lever after a prescribed time interval.

11. A load speed control system comprising, a supporting housing with an inner wall having an opening, a servo follower piston provided with a front portion slidable in said opening and having a hollow rear portion, an auxiliary piston slidable in said hollow rear portion, a drive power lever connected to said auxiliary piston and receiving axial motion therefrom, a spring surrounding said front portion and supported between said inner wall and servo follower piston in the chamber in which said servo follower piston slides, said front portion having a hollow chamber therein having a front and rear opening, the rear opening communicating with the chamber containing said spring, the latter chamber communicating with the rear portion of the chamber in which said servo follower piston slides, the latter rear portion communicating with the hollow rear portion of said piston through a small opening, a lever having a bump thereon positioned opposite said front opening of said chamber in the front portion of said servo follower piston, the position of the bump controlling the effective area of said front opening, a shaft pivotally attached to one end of said lever and having collars formed thereon, a spring loaded piston secured to said shaft, means defining a chamber slidably receiving said spring loaded piston and having an input conduit and an output restriction communicating with a drain, a hollow sleeve receiving the collars on said spring loaded shaft, means cooperating with said sleeve to define a well, one of said collars being effective to regulate the flow of hydraulic fluid from said well to said input conduit, a load control lever which, when moved, imparts axial motion to said sleeve, means for supplying hydraulic fluid to said well, conduit and chambers under pressure to lock said auxiliary piston to said servo follower piston whereby motion of said load control lever is imparted to said drive power lever after a prescribed time interval, a flyball governor which provides a force indicative of load speed, a load speed control lever, a pilot valve acted upon at one end by the latter force and at the other end by a force indicative of the setting of said load speed control lever to control the flow of hydraulic fluid into the input of a system having a desired transfer function, a servo valve whose position is controlled by fluid flow from the output of said system having the desired transfer function, said servo valve being connected to the other end of said lever with the bump thereon to coact with said shaft in controlling the position of said bump relative to said front opening.

References Cited in the file of this patent

UNITED STATES PATENTS

| | | |
|---|---|---|
| 1,203,315 | De Wein | Oct. 31, 1916 |
| 2,423,191 | Kopp | July 1, 1947 |
| 2,665,859 | Papadakos | Jan. 12, 1954 |
| 2,768,647 | Stuart | Oct. 30, 1956 |

FOREIGN PATENTS

| | | |
|---|---|---|
| 113,797 | Australia | Sept. 2, 1941 |